(12) United States Patent
Yamaguchi et al.

(10) Patent No.: US 7,703,320 B2
(45) Date of Patent: Apr. 27, 2010

(54) FLOW MEASURING DEVICE HAVING RESISTORS ARRANGED IN NESTING ARRANGEMENT

(75) Inventors: Junzo Yamaguchi, Nagoya (JP); Yasushi Kohno, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/120,517

(22) Filed: May 14, 2008

(65) Prior Publication Data

US 2008/0289413 A1 Nov. 27, 2008

(30) Foreign Application Priority Data

May 25, 2007 (JP) .............................. 2007-139232

(51) Int. Cl.
*G01F 1/68* (2006.01)
(52) U.S. Cl. .................................. 73/204.26
(58) Field of Classification Search ........................ None
See application file for complete search history.

(56) References Cited

U.S. PATENT DOCUMENTS 5,708,205 A * 1/1998 Yamada et al. ........... 73/204.26
6,557,411 B1 5/2003 Yamada et al.
7,270,000 B2 9/2007 Nakada et al.
2006/0096305 A1 5/2006 Hanzawa et al.
2006/0220662 A1 10/2006 Nakano et al.

FOREIGN PATENT DOCUMENTS

JP 2001-41790 2/2001
JP 2006-98057 4/2006

OTHER PUBLICATIONS

Japanese Office Action dated Jan. 13, 2009 issued in corresponding Japanese Application No. 2007-139232, with English translation.

* cited by examiner

*Primary Examiner*—Harshad Patel
(74) *Attorney, Agent, or Firm*—Nixon & Vanderhye PC

(57) ABSTRACT

According to a flow measuring device, first ranges formed by a first plurality of resistors form a single continuous value range on a flow direction coordinate axis. Thus, the first plurality of resistors is limited from being thermally insulated from one another in the flow direction, and thereby detectivity is improved. Also, second ranges formed by a second plurality of resistors form an other single continuous value range on a longitudinal direction coordinate axis. The other continuous value range includes a position that corresponds to a half length of a heating element in a longitudinal direction. As a result, detection difference is obtained at the position, at which a temperature is most optimally detected, and thereby detectivity is further improved.

2 Claims, 5 Drawing Sheets

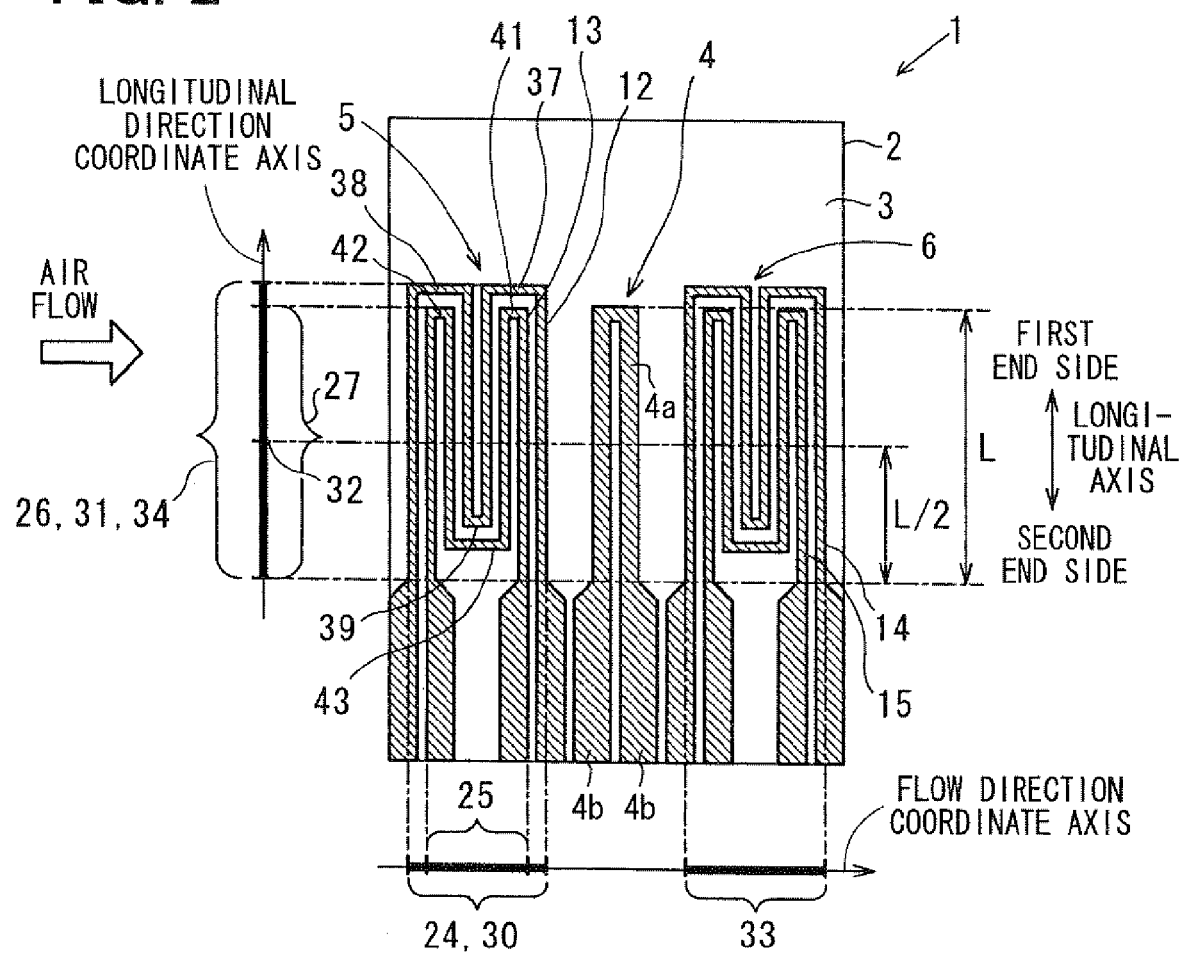

FLOW MEASURING DEVICE HAVING RESISTORS ARRANGED IN NESTING ARRANGEMENT

CROSS REFERENCE TO RELATED APPLICATION

This application is based on and incorporates herein by reference Japanese Patent Application No. 2007-139232 filed on May 25, 2007.

BACKGROUND OF THE INVENTION

1. Field of the Invention

The present invention relates to a flow measuring device that measures a flow of air, and, for example, relates to a flow measuring device that measures a flow of air suctioned into an internal combustion engine.

2. Description of Related Art

As shown in FIGS. 5A and 5B, a conventional flow measuring device 100 is disclosed to include an electrically insulating film 101, a heating element 103, and detection resistor assemblies 104, 105. The electrically insulating film 101 in provided in an air passage and has a planer shape that extends generally in parallel with the flow direction of air. Also, the heating element 103 is provided on a surface 102 of the electrically insulating film 101 for generating heat when energized. The detection resistor assemblies 104, 105 are provided downstream and upper stream of the heating element 103, and each of the assemblies 104, 105 includes multiple resistors. The flow measuring device 100 measures flow of air that flows through an air passage based on a difference or detection difference between detections of the upstream and downstream detection resistor assemblies 104, 105.

The conventional flow measuring device 100 includes detection resistor assemblies 104, 105, and each of the multiple resistors of the detection resistor assemblies 104, 105 is spaced away from one another in a flow direction (see FIG. 5A). The above arrangement is named as a series arrangement. In a case, where each resistor of each of the detection resistor assemblies 104, 105 is arranged as above, heat from the heating element 103 is less likely to be transmitted to the resistor positioned away from the heating element 103 compared with the resistor positioned closer to the heating element 103. As a result, the detectivity may degrade disadvantageously.

In contrast, for example, JP-A-2001-41790 (U.S. Pat. No. 6,557,411) and JP-A-2006-98057 (U.S. Pat. No. 7,270,000) describes that both of the resistors of each of the detection resistor assemblies 104, 105 are arranged symmetrically relative to a center line. In the above case, both resistors of each of the detection resistor assemblies 104, 105 are arranged side by side in a direction perpendicular to the flow direction such that the multiple resistors of each of the detection resistor assemblies 104, 105 are uniformly heated (see FIG. 5B). The above center line passes through a longitudinal direction center of the heating element 103 to extend in the flow direction of air. In other words, the center line passes in the flow direction through a center position of the heating element 103, which center position corresponds to a ½ length of the heating element 103 along the longitudinal axis of the heating element 103. However, when each resistor of the detection resistor assemblies 104, 105 is provided in a parallel arrangement as above, the detection difference may not be sufficiently obtained at the longitudinal direction center, at which the temperature distribution is most clarified. As a result, the detectivity may degrade disadvantageously.

SUMMARY OF THE INVENTION

The present invention is made in view of the above disadvantages. Thus, it is an objective of the present invention to address at least one of the above disadvantages.

According to one aspect of the present invention, there is provided a flow measuring device for measuring a flow of air in an air passage, the flow measuring device including an electrically insulating film, a heating element, an upstream detection resistor assembly, and a downstream detection resistor assembly. The electrically insulating film is provided in the air passage and the electrically insulating film has a planar shape that extends generally in parallel with a direction of the flow of air. The heating element is provided on a surface of the electrically insulating film for generating heat when the heating element is energized. The upstream detection resistor assembly is provided on the surface of the electrically insulating film upstream of the heating element in the flow direction of air. The upstream detection resistor assembly has a first plurality of resistors, and an electrical resistance of each of the first plurality of resistors is changeable depending on a temperature. The downstream detection resistor assembly is provided on the surface of the electrically insulating film downstream of the heating element in the flow direction of air. The downstream detection resistor assembly has a second plurality of resistors. An electrical resistance of each of the second plurality of resistors is changeable depending on a temperature. The flow of air that flows in the air passage is measured based on a difference between (a) a detection of the upstream detection resistor assembly and (b) a detection of the downstream detection resistor assembly. In a case, where a longitudinal axis is defined to extend in parallel with the surface of the electrically insulating film and perpendicularly to the flow direction of air, and where a flow direction coordinate axis is defined to extend on the surface of the electrically insulating film in parallel with the flow direction, and where a longitudinal direction coordinate axis is defined to extend on the surface of the electrically insulating film in parallel with the longitudinal axis, followings are satisfied. Each of the first plurality of resistors of the upstream detection resistor assembly forms a first range projected on the flow direction coordinate axis and forms a second range projected on the longitudinal direction coordinate axis, the first range of the each of the first plurality of resistors overlapping with one another on the flow direction coordinate axis, the second range of each of the first plurality of resistors overlapping with one another on the longitudinal direction coordinate axis. Each of the second plurality of resistors of the downstream detection resistor assembly forms a third range projected on the flow direction coordinate axis and forms a fourth range projected on the longitudinal direction coordinate axis, the third range of the each of the second plurality of resistors overlapping with one another on the flow direction coordinate axis, the fourth range of the each of the second plurality of resistors overlapping with one another on the longitudinal direction coordinate axis. The heating element forms a position projected on the longitudinal direction coordinate axis, the position corresponding to a half length of the heating element along the longitudinal axis, the position being projected on the longitudinal direction coordinate axis within the second range of the each of the first plurality of resistors and the fourth range of the each of the second plurality of resistors.

According to another aspect of the present invention, there is also provided a flow measuring device for measuring a flow of air in an air passage, the flow measuring device including a heating element, an upstream detection resistor assembly, and a downstream detection resistor assembly. The heating element is configured to generate heat when the heating element is energized. The upstream detection resistor assembly is provided upstream of the heating element in a flow direction of air in the air passage and the upstream detection resistor assembly has a first plurality of temperature-sensitive resistors. The downstream detection resistor assembly is provided downstream of the heating element in the flow direction of air and the downstream detection resistor assembly has a second plurality of temperature-sensitive resistors. Each of the first plurality of temperature-sensitive resistors has a first part and a second part. The first part extends in a first direction that is in parallel with the flow direction of air. The second part extends in a second direction perpendicular to the flow direction of air. The first part of the each of the first plurality of temperature-sensitive resistors is arranged so as to face with each other in the second direction. The second part of the each of the first plurality of temperature-sensitive resistors is arranged so as to face with each other in the first direction. Each of the second plurality of temperature-sensitive resistors has a first part and a second part, the first part extending in the first direction, the second part extending in the second direction. The first part of the each of the second plurality of temperature-sensitive resistors is arranged so as to face with each other in the second direction. The second part of the each of the second plurality of temperature-sensitive resistors is arranged so as to face with each other in the first direction. The heating element is arranged such that a central position of the heating element in the second direction is provided between (a) the second part of the each of the first plurality of temperature-sensitive resistors and (b) the second part of the each of the second plurality of temperature-sensitive resistors in the first direction.

BRIEF DESCRIPTION OF THE DRAWINGS

The invention, together with additional objectives, features and advantages thereof, will be best understood from the following description, the appended claims and the accompanying drawings in which:

FIG. 2 is a diagram illustrating a configuration view of a flow measuring device of a second embodiment of the present invention;

DETAILED DESCRIPTION OF PREFERRED EMBODIMENTS

First Embodiment

Figure 1A:
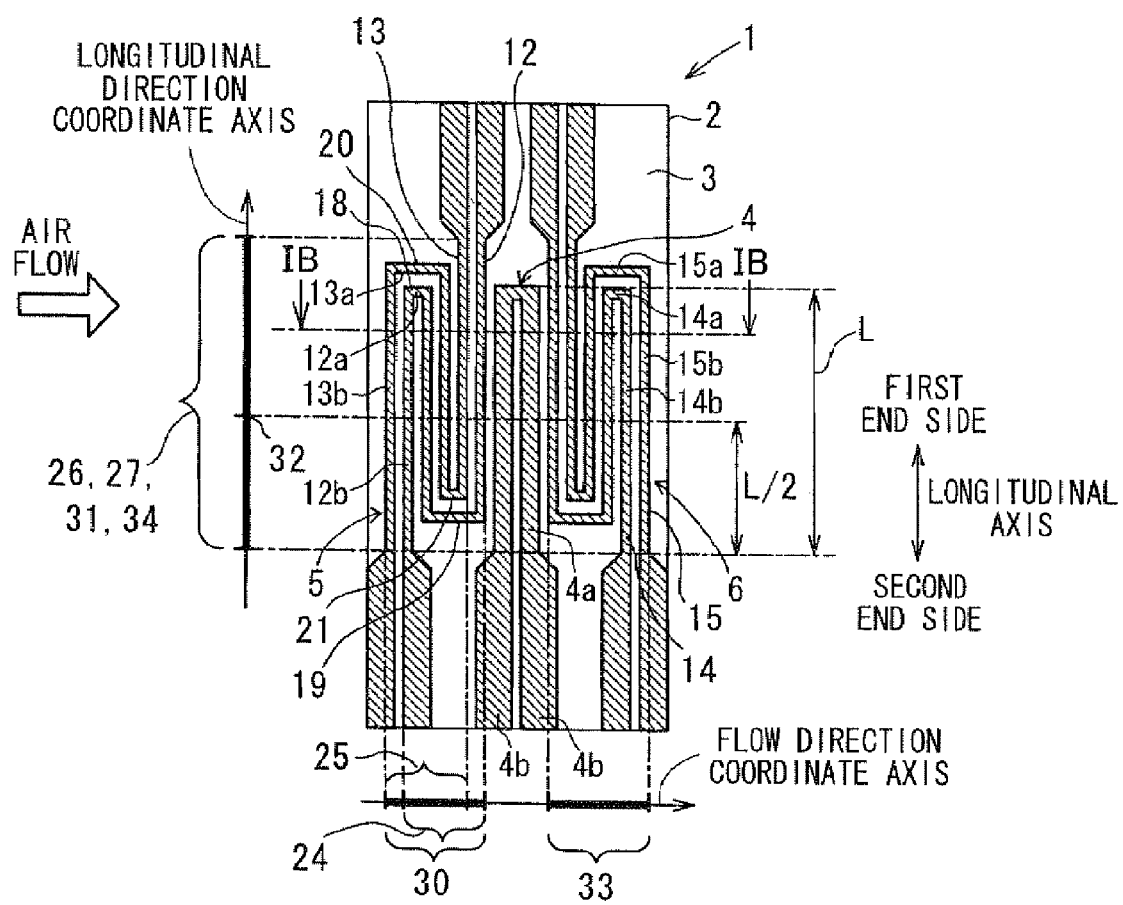
FIG. 1A is a diagram illustrating a configuration view of a flow measuring device of a first embodiment of the present invention.
Figure 1B:
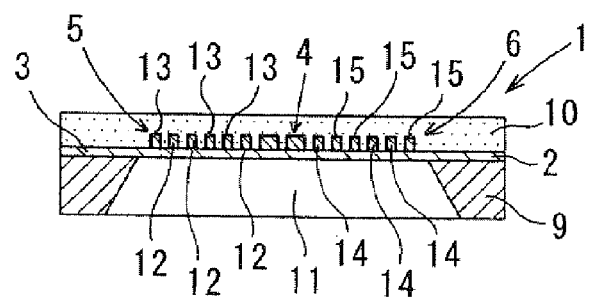
FIG. 1B is a diagram illustrating a cross sectional view of the flow measuring device taken along line IB-IB in FIG. 1A.

A configuration of a flow measuring device 1 of the first embodiment of the present invention is described with reference to FIGS. 1A and 1B. The flow measuring device 1 is used for measuring a flow (e.g., flow rate, flow amount) of air that is suctioned into an internal combustion engine, for example.

The flow measuring device 1 includes an electrically insulating film 2, a heating element 4, and upstream and downstream detection resistor assemblies 5, 6. The electrically insulating film 2 is provided in an air passage and has a planar shape that extends generally in parallel with a flow of air in the passage. The heating element 4 is provided on a surface 3 of the electrically insulating film 2 and generates heat when energized. The upstream and downstream detection resistor assemblies 5, 6 are provided on the surface 3 upstream and downstream of the heating element 4, respectively. The flow measuring device 1 measures a flow of air that flows through the air passage based on a difference between detections of the upstream and downstream detection resistor assemblies 5, 6.

In the description below, a longitudinal axis extends in parallel with the surface 3 of the electrically insulating film 2 and in perpendicular to the flow direction of air.

The electrically insulating film 2 is formed on a surface of a substrate 9 that is disposed in the air passage in parallel with the flow direction of air. Then, the heating element 4 and the upstream and downstream detection resistor assemblies 5, 6 are provided on the surface 3 of the electrically insulating film 2. The heating element 4 and the upstream and downstream detection resistor assemblies 5, 6 are covered by a protection film 10. The electrically insulating film 2 has a void 11 on a back side thereof for thermally insulating the substrate 9 from the heating element 4 and the upstream and downstream detection resistor assemblies 5, 6.

The heating element 4 is made of a resistor, and the resistor is folded such that the heating element 4 has a U-shape. The heating element 4 has a closed end portion 4a of the U-shape on a first end side of the heating element 4 along the longitudinal axis and terminals 4b on a second end side opposite to the first end side, for example, as shown in FIG. 1A. The above closed end portion 4a of the U-shape is defined as a heating part 4a and has a length of L along the longitudinal axis. Each of the upstream and downstream detection resistor assemblies 5, 6 includes two resistors. Specifically, the upstream detection resistor assembly 5 includes two resistors 12, 13, and the downstream detection resistor assembly 6 includes two resistors 14, 15. Each of the resistors 12 to 15 is folded to have terminals on both open ends and one or more U-shapes formed between the terminals as shown in FIG. 1A, for example. Each of the U-shape has a closed end portion in one end, and the closed end portion is named as a U-shape portion in the present specification.

The resistor 12 has U-shape portions 18, 19 on the first end side and the second end side of the resistor 12 along the longitudinal axis, respectively. Also, the resistor 13 has U-shape portions 20, 21 on the first end side and the second end side of the resistor 13 along the longitudinal axis, respectively. The resistors 12, 13 are arranged in a nesting arrangement, in which the U-shape portion 19 of the resistor 12 is located to surround the outside of the U-shape portion 21 of the resistor 13, and the U-shape portion 20 of the resistor 13 is located to surround the outside the U-shape portion 18 of the resistor 12. In other words, the U-shape portion 19 is disposed on the second side end side of the U-shape portion 21, and the U-shape portion 20 is disposed on the first end side of the U-shape portion 18

It is assumed that there is an imaginary coordinate axis that extends in parallel with the flow direction, and another imaginary coordinate axis that extends in parallel with the longitudinal direction. The former coordinate axis is named as a flow direction coordinate axis, and the latter coordinate axis is named as a longitudinal direction coordinate axis. The resistor 12 defines a continuous value range 24 on the flow direction coordinate axis, and the resistor 13 defines a continuous value range 25 on the flow direction coordinate axis. Also, the resistor 12 defines a continuous value range 26 on the longitudinal direction coordinate axis, and the resistor 13 defines a continuous value range 27 on the longitudinal direction coordinate axis.

The value ranges 24, 25 (first ranges) are formed by projecting the resistors 12, 13 perpendicularly on the flow direction coordinate axis, and the value ranges 26, 27 (second ranges) are formed by projecting the resistors 12, 13 perpendicularly on the longitudinal direction coordinate axis. In other words, the value ranges 24, 25 correspond to projections of wiring parts of the resistors 12, 13 other than the terminals, respectively, the projection being projected along the longitudinal axis on the flow direction coordinate axis, for example. Also, the value ranges 26, 27 correspond to projections of the wiring parts of the resistors 12, 13 other than the terminals, respectively, the projection being projected in the flow direction on the longitudinal direction coordinate axis, for example.

When the resistor 12 and the resistor 13 are arranged in the above nesting arrangement, the value range 24 and the value range 25 are partially overlapped with each other on the flow direction coordinate axis to form a single continuous value range 30. The value range 26 and the value range 27 are entirely overlapped with each other on the longitudinal direction coordinate axis to form a single continuous value range 31.

Further, according to the flow measuring device 1 of the first embodiment, the value range 31 projected on the longitudinal direction coordinate axis contains a position 32 that is located correspondingly to a middle of the heating part 4a of the heating element 4 along the longitudinal axis, the heating part 4a having a length L along the longitudinal axis as defined above. In other words, the position 32 on the longitudinal direction coordinate axis corresponds to a half length L/2 of the heating part 4a of the heating element 4, and the position 32 is located within the value range 31 or the value ranges 26, 27 (second ranges).

The upstream detection resistor assembly 5 and the downstream detection resistor assembly 6 are arranged symmetrically relative to the heating element 4. The resistors 14, 15 define value ranges 33, 34 similar to the value ranges 30, 31 defined by the resistors 12, 13. As a result, the position 32 is also located within the value range 34 (fourth ranges).

Advantages of the first embodiment are explained. In the flow measuring device 1 of the first embodiment, the resistors 12, 13 define the continuous value range 30 on the flow direction coordinate axis, and the resistors 14, 15 define the continuous value range 33 on the flow direction coordinate axis. Therefore, the resistor 12 is prevented from being thermally insulated from the resistor 13 in the flow direction, and the resistor 14 is prevented from being thermally insulated from the resistor 15 in the flow direction. As a result, regardless of a distance from the heating element 4, the heat generated by the heating element 4 is easily transmitted to the entire resistors 12 to 15, which constitute the upstream and downstream detection resistor assemblies 5, 6. Thereby, the detectivity is improved.

Also, the resistors 12, 13 define the continuous value range 31 on the longitudinal direction coordinate axis, and the resistors 14, 15 define the continuous value range 34 on the longitudinal direction coordinate axis. Also, the value ranges 31, 34 defined on the longitudinal direction coordinate axis includes the position 32 that corresponds to the half length L/2 of the heating part 4a of the heating element 4. Thus, the value ranges 31, 34 is adapted to contain the position 32, at which a temperature distribution is most clarified or is optimum for measurement. As a result, the detection difference on the position 32 is efficiently acquired, and thereby the detectivity is improved.

Also, according to the flow measuring device 1, at least a part of the resistor 12 forms the nesting arrangement formed with the part of the resistor 13. As a result, the continuous value range 30 is reliably defined on the flow direction coordinate axis, and the continuous value range 31 is reliably defined on the longitudinal direction coordinate axis.

The configuration of the flow measuring device of the present embodiment may be defined as below referring to FIG. 1A. Each of the resistors 12, 13 has a first part 12a, 13a that extends in a first direction that is in parallel with the flow direction of air, and also has a second part 12b, 13b that extends in a second direction perpendicular to the flow direction of air as shown in FIG. 1A. In the above definition, the first part 12a, 13a of the each of the resistors 12, 13 is arranged so as to face with each other in the second direction or in the longitudinal direction, and the second part 12b, 13b of the each of the resistors 12, 13 is arranged so as to face with each other in the first direction or in the flow direction. Similarly, each of the resistors 14, 15 has a first part 14a, 15a that extends in the first direction and has a second part 14b, 15b that extends in the second direction. The first part 14a, 15a of the each of the resistors 14, 15 is arranged so as to face with each other in the second direction. The second part 14b, 15b of the each of the resistors 14, 15 is arranged so as to face with each other in the first direction. In the above arrangement, the heating element 4 is arranged such that a central position of the heating element 4 in the second direction is provided between (a) the second part 12b, 13b of the each of the resistors 12, 13 and (b) the second part 14b, 15b of the each of the resistors 14, 15 in the first direction. In the above, the central position of the heating element 4 corresponds to the center of the heating part 4a in the longitudinal direction, for example. Thus, also in the configuration as defined above, the similar advantages of the present embodiment are achieved.

Second Embodiment

A configuration of a flow measuring device 1 of the second embodiment of the present invention is described referring to FIG. 2. Similar components of the flow measuring device of the present embodiment, which are similar to the components of the flow measuring device of the first embodiment, will be indicated by the same numerals.

According to the flow measuring device 1 of the second embodiment, the resistor 12 includes two U-shape portions 37, 38 on the first end side of the resistor 12 along the longitudinal axis and includes a U-shape portion 39 on the second end side of the resistor 12 to form an M shape. Also, the resistor 13 includes two U-shape portions 41, 42 on the first end side of the resistor 13 along the longitudinal axis and includes a U-shape portion 43 on the second end side of the resistor 13 to form an M shape. The resistors 12, 13 are arranged in another nesting arrangement, in which each of the U-shape portions 37, 38 is located to surround the outside of the corresponding one of the U-shape portions 41, 42, and the U-shape portion 43 is located to surround the outside of the U-shape portion 39. In other words, the U-shape portions 37, 38 are disposed on the first end side of the U-shape portions 41, 42 to surround the outside of the U-shape portions 41, 42, respectively. Also, the U-shape portion 43 is disposed on the second end side of the U-shape portion 39 to surround the outside of the U-shape portion 39.

Further, similar to the first embodiment, the resistor 12 defines the continuous value range 24 on the flow direction coordinate axis and defines the continuous value range 26 on the longitudinal direction coordinate axis. Also, the resistor 13 defines the continuous value range 25 on the flow direction coordinate axis and defines the continuous value range 27 on the longitudinal direction coordinate axis.

Then, because the resistor 12 and the resistor 13 are arranged in the above nesting arrangement, the value range 24 ranges over the value range 25 on the flow direction coordinate axis to form the continuous value range 30. In other words, the value range 24 contains the value range 25 on the flow direction coordinate axis. Also, the value range 26 ranges over the value range 27 to define the continuous value range 31 on the longitudinal direction coordinate axis. In other words, the value range 26 contains the value range 27 on the longitudinal direction coordinate axis.

The value range 31 contains the position 32 that is located correspondingly to the half length L/2 or the middle of the heating part 4a of the heating element 4. Note that the resistors 14, 15 define the value ranges 33, 34 similar to the value ranges 30, 31 defined by the resistors 12, 13.

As above, the flow measuring device 1 of the second embodiment is enabled to achieve the advantages similar to the flow measuring device 1 of the first embodiment.

Third Embodiment

Figure 3:
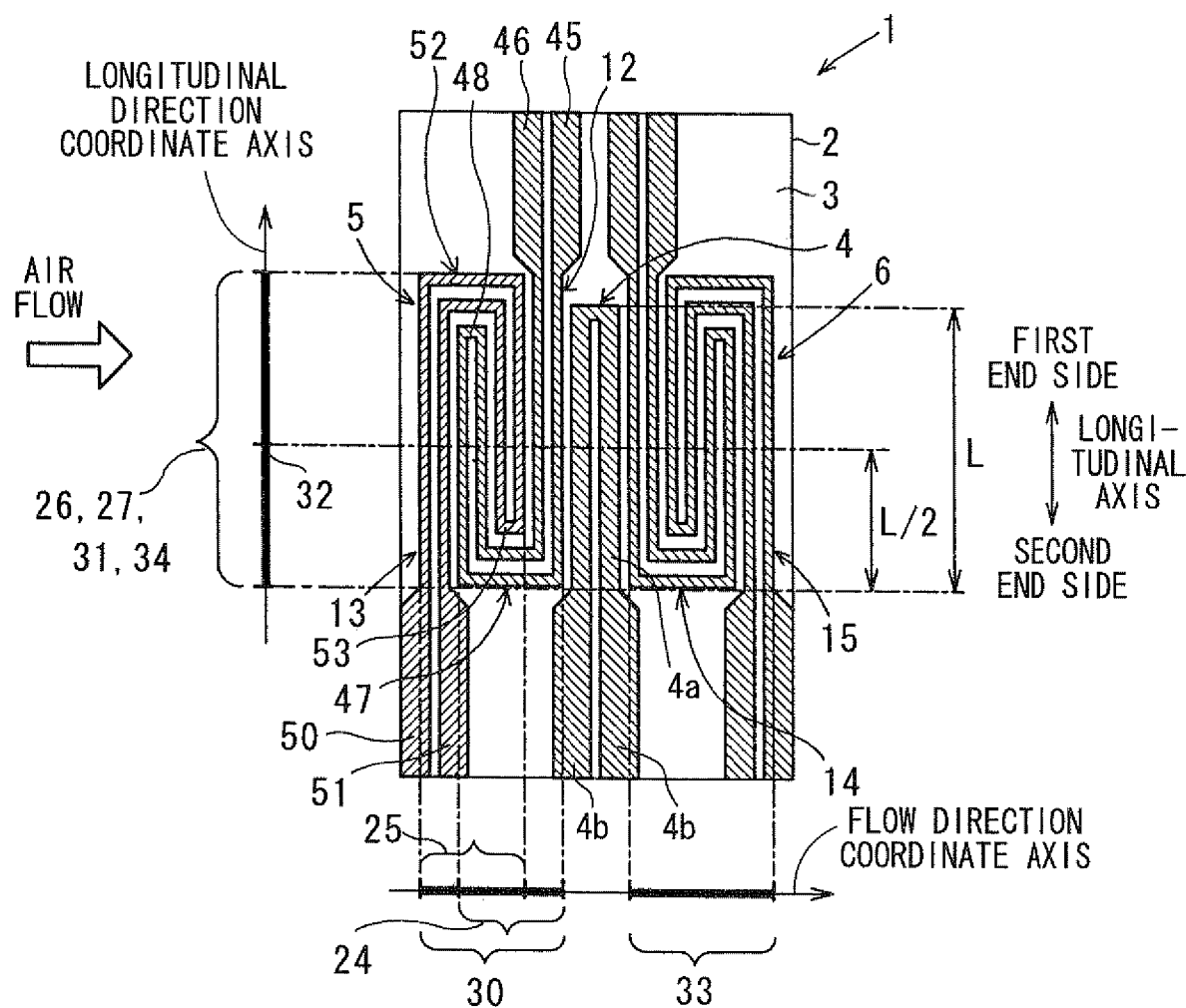
FIG. 3 is a diagram illustrating a configuration view of a flow measuring device of a third embodiment of the present invention.

A configuration of a flow measuring device 1 of the third embodiment is described with reference to FIG. 3. Similar components of the flow measuring device of the present embodiment, which are similar to the components of the flow measuring device of the first embodiment, will be indicated by the same numerals.

According to the flow measuring device 1 of the third embodiment, the resistor 12 is arranged and folded so as to have both terminals 45, 46 on the first end side along the longitudinal axis. The two wirings extend in parallel with each other from the terminals 45, 46 toward the second end side along the longitudinal axis and form a double U-shape portion 47 at the second end side. The above double U-shape portion 47 is made by folding or bending both two wirings in a condition, where one of the two wirings is disposed inside or the first end side of the other one of the two wirings as shown in FIG. 3. Then, the two wirings extends from the second end side to the first end side and form a single U-shape portion 48 at the first end side along the longitudinal axis. The single U-shape portion 48 is formed by connecting the one and the other one of the two wirings at the first end side. Also, the resistor 13 is arranged and folded so as to have two terminals 50, 51 at the second end side along the longitudinal axis. Two wirings extend in parallel with each other from the terminals 50, 51 toward the first end side along the longitudinal axis to form a double U-shape portion 52 at the first end side. The double U-shape portion 52 is formed by bending the two wirings in a condition, where one of the wirings is disposed inside or the second end side of the other one of the wirings. Then, the two wirings extend from the first end side to the second end side to form a single U-shape portion 53. The above single U-shape portion 53 is formed by connecting the one and the other one of the wirings at the second end side.

The resistors 12, 13 are arranged in a nesting arrangement, in which the double U-shape portion 47 is provided to surround the outside of the single U-shape portion 53, and in which the double U-shape portion 52 is provided to surround the outside of the single U-shape portion 48. In other words, the double U-shape portion 47 is disposed on the second end side of the single U-shape portion 53 to surround the outside of the single U-shape portion 53, for example. Also, the double U-shape portion 52 is disposed on the first end side of the single U-shape portion 48 to surround the outside of the single U-shape portion 48.

Further, similar to the first embodiment, the resistor 12 defines the continuous value range 24 on the flow direction coordinate axis and defines the continuous value range 26 on the longitudinal direction coordinate axis. Also, the resistor 13 defines the continuous value range 25 on the flow direction coordinate axis and defines the continuous value range 27 on the longitudinal direction coordinate axis.

Because the resistor 12 and the resistor 13 are arranged in the above nesting arrangement, the value range 24 and the value range 25 partly overlap with each other on the flow direction coordinate axis to define the single continuous value range 30. Also, the value range 26 and the value range 27 entirely overlap with each other on the longitudinal direction coordinate axis to define the single continuous value range 31.

Also, the value range 31 includes the position 32 that is located correspondingly to the half length L/2 of the heating part 4a of the heating element 4. Note that, the resistors 14, 15 define the value ranges 33, 34 similar to the value ranges 30, 31 defined by the resistors 12, 13.

As above, the flow measuring device 1 of the third embodiment can achieve the similar advantages similar to the flow measuring device 1 of the first embodiment.

Fourth Embodiment

Figure 4:
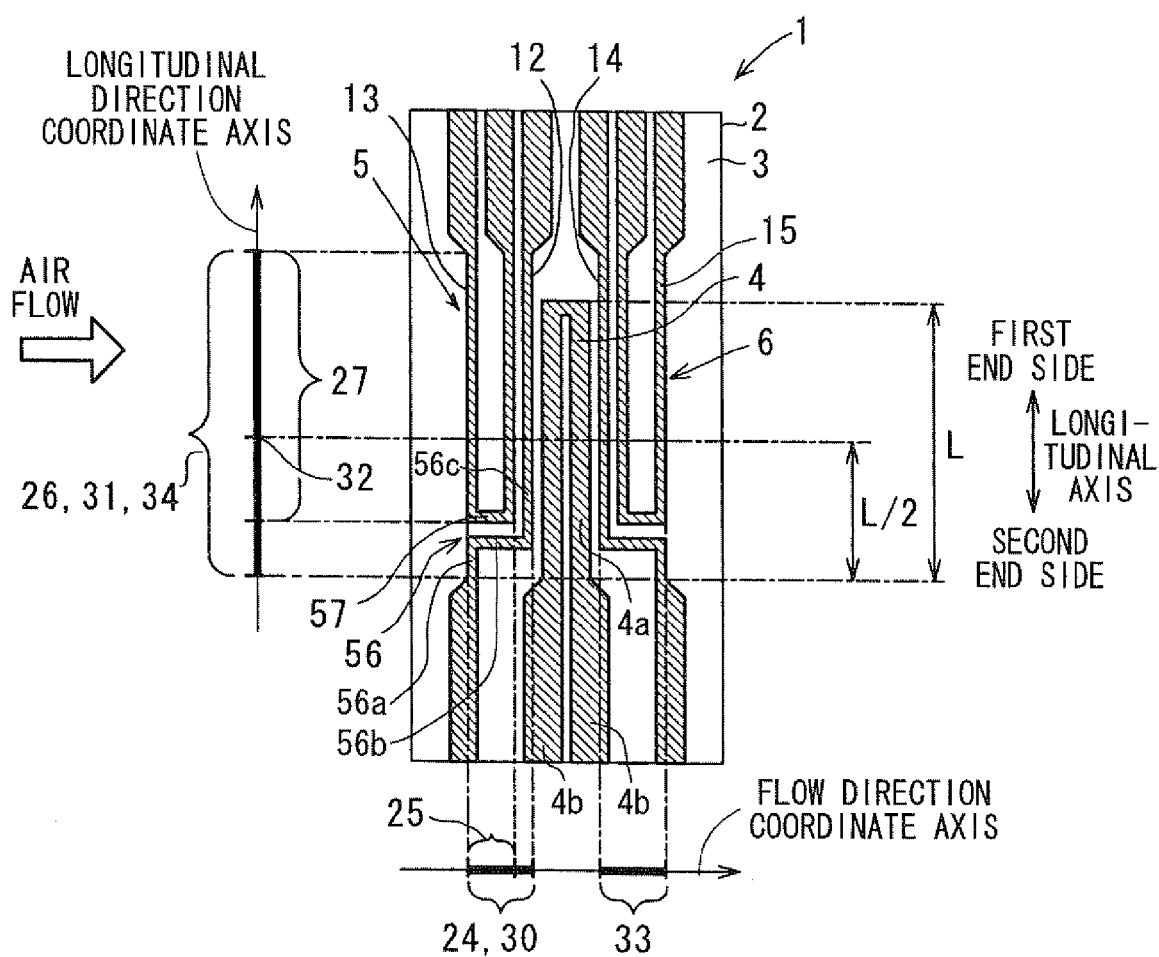
FIG. 4 is a diagram illustrating a configuration view of a flow measuring device of a fourth embodiment of the present invention.
Figure 5A:
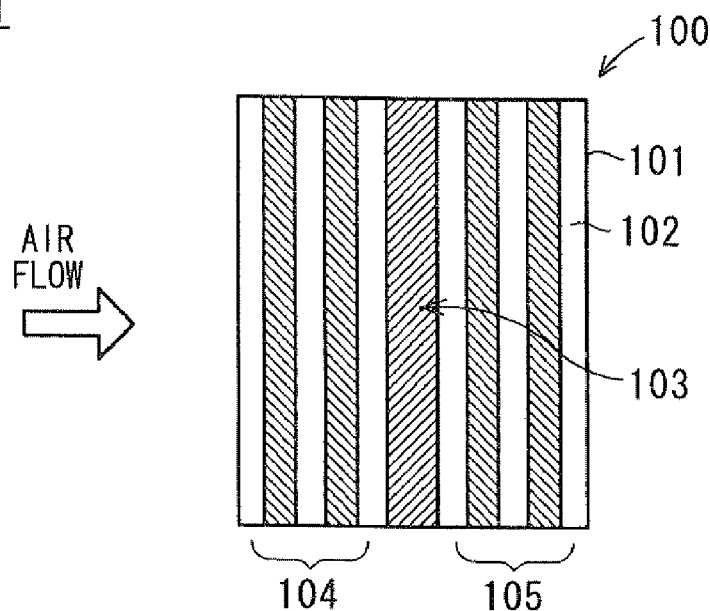
FIG. 5A is an explanatory diagram of a conventional flow measuring device, in which resistors are provided in a series arrangement.
Figure 5B:
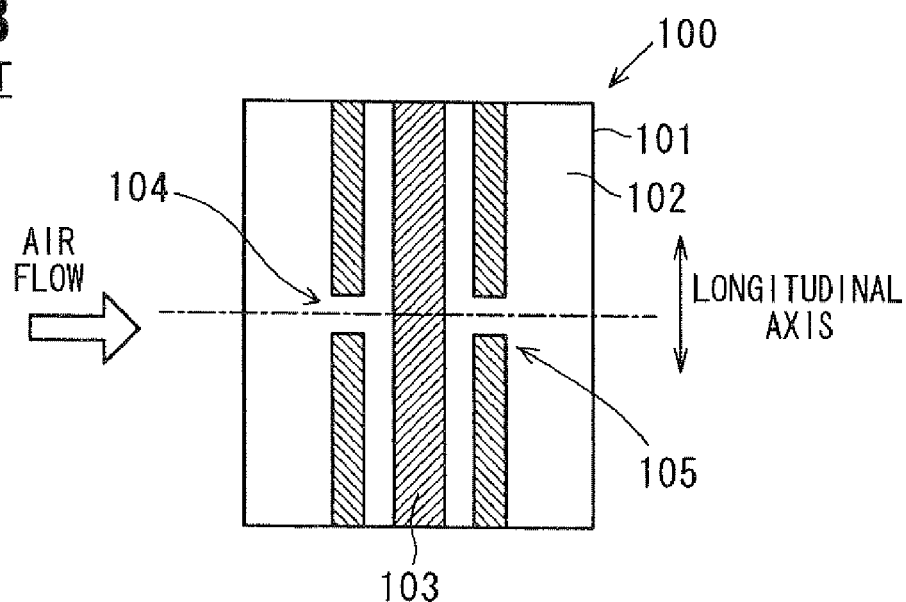
FIG. 5B is an explanatory diagram of a conventional flow measuring device, in which resistors are provided in a parallel arrangement.

A configuration of a flow measuring device 1 of the fourth embodiment is described referring to FIG. 4. Similar components of the flow measuring device of the present embodiment, which are similar to the components of the flow measuring device of the first embodiment, will be indicated by the same numerals.

According to the flow measuring device 1 of the fourth embodiment, the resistor 12 is crooked in a crank shape and has a step portion 56. In other words, the resistor 12 includes first to third parts 56a to 56c to form the crank shape of the step portion 56. The second part 56b projects from the first end side of the first part 56a to connect with the second end side of the third part 56c. The first part 56a and the third part 56c extend from both ends of the second part 56b in the opposite directions along the longitudinal direction coordinate axis, and the second part 56b extends along the flow direction coordinate axis as shown in FIG. 4. Also, the resistor 13 has a U-shape portion 57 on the second end side of the resistor 13 along the longitudinal axis. Note that the U-shape portion 57 has a U shape opening toward the first end side of the resistor 13. The resistors 12, 13 are arranged such that the step portion 56 faces with the U-shape portion 57 in the longitudinal direction.

Similar to the first embodiment, the resistor 12 defines the continuous value range 24 on the flow direction coordinate axis and defines the continuous value range 26 on the longitudinal direction coordinate axis. Also, the resistor 13 defines the continuous value range 25 on the flow direction coordinate axis and defines the continuous value range 27 on the longitudinal direction coordinate axis.

The value range 24 ranges over the value range 25 on the flow direction coordinate axis to define the single continuous value range 30. Also, the value range 26 ranges over the value range 27 on the longitudinal direction coordinate axis to define the single continuous value range 31. The value range 31 includes the position 32 that is located correspondingly to the half length L/2 of the heating part 4a of the heating element. Note that, the resistors 14, 15 define the value ranges 33, 34 similar to the value ranges 30, 31 defined by the resistors 12, 13.

As above, the flow measuring device 1 of the fourth embodiment can achieve the similar advantages similar to the flow measuring device 1 of the first embodiment.

Additional advantages and modifications will readily occur to those skilled in the art. The invention in its broader terms is therefore not limited to the specific details, representative apparatus, and illustrative examples shown and described.

What is claimed is:

1. A flow measuring device for measuring a flow of air in an air passage, the flow measuring device comprising:
    an electrically insulating film that is provided in the air passage, the electrically insulating film having a planar shape that extends generally in parallel with a direction of the flow of air;
    a heating element that is provided on a surface of the electrically insulating film for generating heat when the heating element is energized;
    an upstream detection resistor assembly that is provided on the surface of the electrically insulating film upstream of the heating element in the flow direction of air, the upstream detection resistor assembly having a first plurality of resistors, an electrical resistance of each of the first plurality of resistors being changeable depending on a temperature; and
    a downstream detection resistor assembly that is provided on the surface of the electrically insulating film downstream of the heating element in the flow direction of air, the downstream detection resistor assembly having a second plurality of resistors, an electrical resistance of each of the second plurality of resistors being changeable depending on a temperature, wherein:
    the flow of air that flows in the air passage is measured based on a difference between (a) a detection of the upstream detection resistor assembly and (b) a detection of the downstream detection resistor assembly; and
    when a longitudinal axis is defined to extend in parallel with the surface of the electrically insulating film and perpendicularly to the flow direction of air, and when a flow direction coordinate axis is defined to extend on the surface of the electrically insulating film in parallel with the flow direction, and when a longitudinal direction coordinate axis is defined to extend on the surface of the electrically insulating film in parallel with the longitudinal axis, the following conditions are satisfied:
        each of the first plurality of resistors of the upstream detection resistor assembly forms a first range projected on the flow direction coordinate axis and forms a second range projected on the longitudinal direction coordinate axis, the first range of each of the first plurality of resistors overlapping with one another on the flow direction coordinate axis, the second range of each of the first plurality of resistors overlapping with one another on the longitudinal direction coordinate axis;
        each of the second plurality of resistors of the downstream detection resistor assembly forms a third range projected on the flow direction coordinate axis and forms a fourth range projected on the longitudinal direction coordinate axis, the third range of each of the second plurality of resistors overlapping with one another on the flow direction coordinate axis, the fourth range of each of the second plurality of resistors overlapping with one another on the longitudinal direction coordinate axis; and
        a position projected on the longitudinal direction coordinate axis corresponding to a mid-point of the heating element along the longitudinal axis being within the second range of each of the first plurality of resistors and the fourth range of each of the second plurality of resistors;
    a part of one of the first plurality of resistors and a part of an other of the first plurality of resistors are arranged in one nesting arrangement;
    a part of one of the second plurality of resistors and a part of an other of the second plurality of resistors are arranged in another nesting arrangement; and
    parts of the first plurality of resistors and the second plurality of resistors extend continuously along the longitudinal axis adjacent a part of the heating element that corresponds to said mid-point of the heating element along the longitudinal axis,
    whereby heat generated by the heating element around said mid-point of the heating element is caused to inevitably flow over the continuously longitudinally extending parts of the resistors.

2. A flow measuring device for measuring a flow of air in an air passage, the flow measuring device comprising:
    a heating element configured to generate heat when the heating element is energized;
    an upstream detection resistor assembly that is provided upstream of the heating element in a flow direction of air in the air passage, the upstream detection resistor assembly having a first plurality of temperature-sensitive resistors; and
    a downstream detection resistor assembly that is provided downstream of the heating element in the flow direction of air, the downstream detection resistor assembly having a second plurality of temperature-sensitive resistors, wherein:
    each of the first plurality of temperature-sensitive resistors has a first part and a second part, the first part extending in a first direction that is in parallel with the flow direction of air, the second part extending in a second direction perpendicular to the flow direction of air, the first part of each of the first plurality of temperature-sensitive resistors being arranged so as to face each other in the second direction, the second part of each of the first plurality of temperature-sensitive resistors being arranged so as to face each other in the first direction;
    each of the second plurality of temperature-sensitive resistors has a first part and a second part, the first part extending in the first direction, the second part extending in the second direction, the first part of each of the second plurality of temperature-sensitive resistors being arranged so as to face each other in the second direction, the second part of each of the second plurality of temperature-sensitive resistors being arranged so as to face each other in the first direction;
    the heating element is arranged such that a central position of the heating element in the second direction is provided between (a) every second part of each of the first plurality of temperature-sensitive resistors and (b) every second part of each of the second plurality of temperature-sensitive resistors in the first direction;

a part of one of the first plurality of temperature-sensitive resistors and a part of an other of the first plurality of temperature-sensitive resistors are arranged in one nesting arrangement;

a part of one of the second plurality of temperature-sensitive resistors and a part of an other of the second plurality of temperature-sensitive resistors are arranged in another nesting arrangement; and every second part of each of the first plurality of temperature-sensitive resistors and every second part of each of the second plurality of temperature-sensitive resistors extends continuously in the second direction at least at a longitudinal position corresponding to the central position of the heating element, whereby heat generated by the heating element around said central portion of the heating element is caused to inevitably flow over the second parts of the resistors.

* * * * *